US008635402B2

(12) United States Patent
Torii

(10) Patent No.: US 8,635,402 B2
(45) Date of Patent: Jan. 21, 2014

(54) STORAGE SYSTEM AND STORAGE ACCESS METHOD AND PROGRAM

(75) Inventor: Takashi Torii, Tokyo (JP)

(73) Assignee: NEC Corporation, Tokyo (JP)

( * ) Notice: Subject to any disclaimer, the term of this patent is extended or adjusted under 35 U.S.C. 154(b) by 298 days.

(21) Appl. No.: 13/262,048

(22) PCT Filed: Mar. 31, 2010

(86) PCT No.: PCT/JP2010/055817
§ 371 (c)(1),
(2), (4) Date: Sep. 29, 2011

(87) PCT Pub. No.: WO2010/114006
PCT Pub. Date: Oct. 7, 2010

(65) Prior Publication Data
US 2012/0036317 A1 Feb. 9, 2012

(30) Foreign Application Priority Data

Mar. 31, 2009 (JP) ................................. 2009-086634

(51) Int. Cl.
G06F 12/00 (2006.01)
G06F 13/00 (2006.01)
G06F 13/28 (2006.01)
G06F 9/26 (2006.01)
G06F 9/34 (2006.01)
G06F 7/00 (2006.01)
G06F 17/30 (2006.01)

(52) U.S. Cl.
USPC ............................. 711/108; 711/216; 707/747

(58) Field of Classification Search
USPC .................................. 711/108, 216; 707/747
See application file for complete search history.

(56) References Cited

U.S. PATENT DOCUMENTS

2010/0217953 A1* 8/2010 Beaman et al. ............... 711/216
2010/0287171 A1* 11/2010 Schneider ..................... 707/759
2010/0293332 A1* 11/2010 Krishnaprasad et al. ..... 711/119

FOREIGN PATENT DOCUMENTS

JP 2009020757 A 1/2009

OTHER PUBLICATIONS

International Search Report for PCT/JP2010/055817 mailed Apr. 27, 2010.
"'Han'yo kara Sen'yo e'", Nikkei Computer, No. 726, Mar. 18, 2009, pp. 40-47.
Y. Shono, "Dai 1 sho, memcached Nyumon, shikumi to Donyu Hoho o Manabu", WEB+DB PRESS, vol. 47, Dec. 1, 2008, pp. 60-64.

* cited by examiner

Primary Examiner — Matthew Bradley
Assistant Examiner — Rocio Del Mar Perez-Velez

(57) ABSTRACT

A system has a data structure in which a value can be obtained from a key. In a write access, a first pair <Key,Hash(Value)> and a second pair <Hash(Value),Value> are stored respectively in a volatile storage device. The first pair <Key,Hash (Value)> is saved in a nonvolatile storage device before returning a response, and the second pair <Hash(Value), Value> is saved in the first storage device at any time with the second pair saved in the volatile storage device. In a read access in which a value is obtained from a key, it is determined that data is not stored normally if the second pair is not found in processing in which after obtaining the hash value of the value from the first pair, the second pair is read.

15 Claims, 10 Drawing Sheets

STORAGE SYSTEM AND STORAGE ACCESS METHOD AND PROGRAM

CROSS-REFERENCE TO RELATED APPLICATIONS

The present application claims priority from Japanese Patent Application No. 2009-086634 (filed on Mar. 31, 2009) the content of which is hereby incorporated in its entirety by reference into this specification.

TECHNICAL FIELD

The present invention relates to a storage system, method, and program, and more particularly to a storage system, method, and program advantageously applicable to key-value storage.

BACKGROUND

A storage system is configured by various types of storage devices. The reason is that each storage device has a unique characteristic and, therefore, it is efficient to combine the characteristics of the storage devices in order to increase performance and reliability of the entire system.

In general, high-speed storage is small in capacity while large-capacity storage is low in speed. How these types of storage are combined to provide large-capacity, high-speed, and high-reliability storage is an important subject of a storage system.

A high-speed and small-capacity storage includes for example, a semiconductor memory such as a RAM(Random Access Memory). A low-speed and large-capacity storage includes a hard disk (HDD). In general, data is saved on a hard disk. A memory (RAM) is used as a cache (disk cache) because the storage capacity of the memory is much smaller than that of a disk and because the memory is volatile (data is lost when the power is off). Data is stored on a hard disk and is accessed by reading from, or written to, the hard disk with an address on the hard disk (block address) specified. The input/output access speed of a hard disk is slower than that of a memory and so the processing becomes slow if access is made to the hard disk each time data is required. To address this problem, a memory (disk cache) is provided between the hard disk and a host to store once-accessed data not only on the hard disk but also in the memory. This configuration allows data in the memory (cache) to be returned without accessing the hard disk if access is made to the same address again, thus speeding up the access. This is how the cache works.

In addition, many ideas have conventionally been studied and implemented considering the characteristics of a hard disk to increase the data access speed; for example, data is perfected or is stored as a sequential log at write time.

As described above, a storage system has been built on the premise that the capacity of a memory is significantly smaller than that of a hard disk and that the amount of data required for processing is larger than the amount of a memory.

Recently, however, an increase memory capacity has an effect on this premise. For example, a latest product, even a commodity server, can have 100 GB or more of memory (DRAM (Dynamic Random Access Memory)) per unit.

In addition, if the memory of several servers can be shared among clusters by means of the distributed shared memory technology, the memory capacity is on the order of TB(terabytes) that enables enough capacity to be allocated to most processing. Products are available today that take advantage of this situation to perform all processing in memory. Among known storage products that perform all processing in memory are "Oracle Coherence", an in-memory product from Oracle corporation, and open-source system "memcached" (used, for example, in the distributed memory cache system at major websites). Attention has been paid also to an on-memory DB (memory DB) that enables high-speed data processing without disk access during update and search. These products implement high-speed data processing on the premise that data required for the processing is all in memory.

On the other hand, there has been increasing interest today in key-value data store ("Amazon Dynamo" from Amazom.com Inc., "memchached", etc.). The key-value distributed data store is characterized in that a memory map is not shared, a value is variable-length, a client-server model is applicable, and the distribution method is determined by the client side. The key-value distributed data store is advantageous in that there is no need for storage servers to cooperate with each other and scalable expansion is easy (The key-value data store will be described later in the exemplary embodiment of the present invention).

SUMMARY

The following gives an analysis of the present invention.

As described above, a significant increase in memory capacity allows storage to be built only by a memory. However, a memory such as a DRAM, which allows fast access, is volatile storage and so data is lost when the power is off. This means that storing data only in the memory is inadequate as a storage.

To ensure permanent storage, data must be stored also on non-volatile storage, such as a hard disk (HDD), in which data is retained even after the power is off. However, saving data into a hard disk each time data is written into memory leads to a long response time (access time). Therefore, an attempt to configure a storage only by a memory to increase a processing speed involves, in practice, saving data on a hard disk, and this reduces the merit of configuring a storage only by a memory.

To address this problem, there is a need for reducing the amount of data to be saved on a hard disk and, at the same time, to increase reliability.

This problem is common to a storage system, and some existing file systems or databases have a mechanism to address this problem. However, those file systems or databases presume that data is on a hard disk and a memory is used as a cache. Therefore, this configuration requires special consideration for the arrangement of data on the hard disk. In addition, because the memory is configured as a cache (disk cache), the disk is accessed as necessary on an on-demand basis (for example, to read disk data at cache mishit time or to perform write-back or write-through at data update time, etc.). An attempt to apply those file systems or databases to a distributed storage server requires cooperation among servers, as a result of which it becomes difficult to implement a system that ensures scalable extension while achieving high-speed and reliability.

In view of the foregoing, it is an object of the present invention to provide a system, method, and program advantageously applicable to distributed storage that can achieve high speed and reliability and that can be expanded scalably.

According to the present invention, there is provided a storage system having a key-value data store configuration in which a key and a value are stored in an associated manner and a key is searched for to find a value associated with the key, said storage system comprising a means that responsive to a request to write a pair of a key and a value, calculates a hash value of said value, and stores a first pair including said key and said hash value of said value respectively as a key and a value, and a second pair including said hash value of said value and said value respectively as a key and a value, respectively in a storage device, and responsive to a read request, searches said storage device, using a key specified by said read request, to find a hash value of a value that forms said first pair with said key specified, and searches said storage device, using said found hash value of said value, to find a value that forms said second pair with said hash value of said value, and if as a result of searching said storage device using said hash value of said value, a value that forms said second pair with said hash value of said value is not found in said storage device, determines that said first pair is not saved normally in said storage device.

According to the present invention, there is provided a storage access method for use on key-value storage in which a key and a value, are stored in an associated manner and a key is searched for to find a value associated with said key, said storage access method comprising:

responsive to a request to write a pair of a key and a value, calculating a hash value of said value; and storing a first pair including said key and said hash value of said value respectively as a key and a value and a second pair including said hash value of said value and said value respectively as a key and a value, respectively in a storage device, and responsive to a read request, searching said storage device, using a key specified by said read request, to find said hash value of said value that forms said first pair with said key; and searching said storage device, using said found hash value of said value, to find a value that forms said second pair with said hash value of said value, and if as a result of searching said storage device using said hash value of said value, a value that forms said second pair with said hash value of said value is not found in said storage device, determining that said first pair is not saved normally in said storage device.

According to the present invention, there is provided a program that causes a computer which configures a storage system in which a key and a value are stored in an associated manner and a key is searched for to find a value associated with said key, to execute the processing comprising:

responsive to a request to write a pair of a key and a value, calculating a hash value of said value; and storing a first pair including said key and said hash value of said value respectively as a key and a value, and a second pair including said hash value of said value and said value respectively as a key and a value, respectively in a storage device; and responsive to a read request, searching said storage device, using a key specified by said read request, to find said hash value of said value that forms said first pair with said key; and searching said storage device, using said obtained hash value of said value, to find a value that forms said second pair with said hash value of said value, and if as a result of searching said storage device using said hash value of said value, a value that forms said second pair with said hash value of said value is not found in said storage device, determining that said first pair is not saved normally in said storage device. According to the present invention, there is also provided a computer-readable recording medium storing the program according to the present invention.

The present invention is advantageously applicable to distributed storage that can achieve high speed and reliability and can be scalably expanded.

Still other features and advantages of the present invention will become readily apparent to those skilled in this art from the following detailed description in conjunction with the accompanying drawings wherein only exemplary embodiments of the invention are shown and described, simply by way of illustration of the best mode contemplated of carrying out this invention. As will be realized, the invention is capable of other and different embodiments, and its several details are capable of modifications in various obvious respects, all without departing from the invention. Accordingly, the drawing and description are to be regarded as illustrative in nature, and not as restrictive.

PREFERRED MODES

Figure 1:
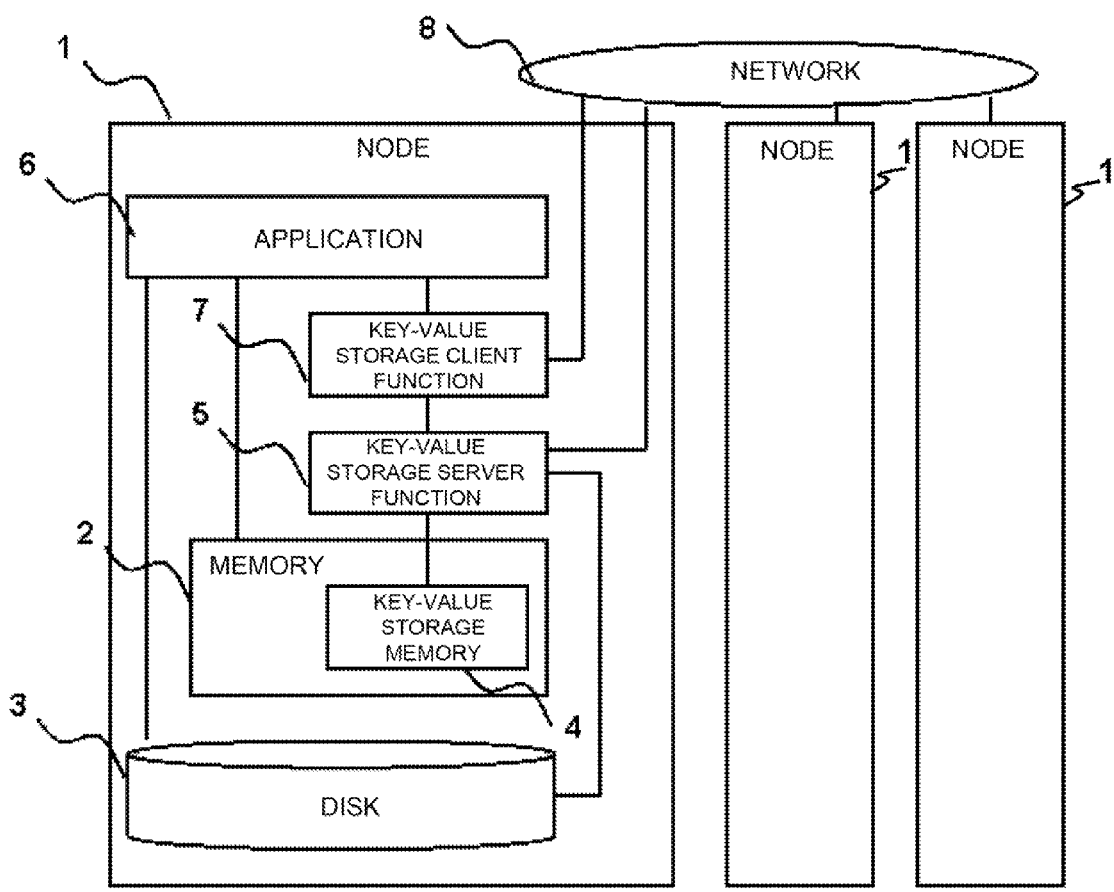
FIG. 1 is a diagram showing a system configuration in one exemplary embodiment of the present invention.

The following describes the principle of operation of the present invention, followed by the description of exemplary embodiments. The present invention assumes that data is stored in memory. In the present invention, data is stored on a hard disk (hereinafter simply called a "disk") as described above in order to retain memory data when the power is turned off, but data is not read from the disk on an on-demand basis when an access request is received. A storage system according to the present invention reads saved data from disk when started and expands the data into the memory such as a RAM. In this way, the basic operation of the storage system of the present invention differs from that of an existing file system or a database.

In the present invention, a method for increasing reliability is also different from that of an existing system. When considering this problem, the important element is a data model.

In the present invention, it is assumed that data remains in memory. To allow data to remain in memory, the memory capacity of one node is insufficient and therefore nodes must be clustered to configure distributed shared memory. This means that data model used in the present invention must be the one suitable for the distributed shared memory.

Several distributed shared memories have been developed. Among them are:

Method in which address map is shared

Method in which communication is carried out via MPI (Message Passing Interface)

The problem with those methods is that performance is not increased as more and more nodes are added.

Today, attention has been paid to key-value storage, a method for implementing distributed shared memory based on a set of a key and a value. The key-value storage is a data model also referred to as an associative array. Because the relation among the items (set of key and value) is independent, the key-value storage is suitable for distributed configuration and, in addition, has the merit that performance can be increased easily and scalably even when the number of nodes are increased.

The present invention employs key-value storage as the data model to solve the problem of both performance and reliability. More specifically, the present invention solves the problem of reducing the amount of data that is stored in memory and, at the same time, saved on the disk synchronously.

In the present invention, multi-level, indirect reference is made to the key-value storage in which a value of a first-stage (=corresponds to a key in a second stage) is a hash value of an actual value (=value of the second stage).

In the present invention, responsive to a request to write a pair of a key and a value, the storage system calculates a hash value of the value and stores a first pair, which includes the key and the hash value of the value respectively as a key and a value, and a second pair, which includes the hash value of the value and the value respectively as a key and a value, respectively in a storage device. When a read request is received, the storage system searches the storage device, using a specified key, to obtain a hash value of a value that forms a first pair with the key, and searches the storage device, using the obtained hash value of the value, to obtain a value (real value) that forms a second pair with the hash value of the value. In this case, if it is found that, as a result of searching the storage device using the hash value of the value, the storage device does not store a value that forms the second pair with the hash value of the value, the storage system determines that the first pair is not saved normally in the storage device.

In the present invention, a distributed storage system comprises multiple key-value storage servers, each of which stores a pair of a key and a value at write time and obtains a value through a search using a key at read time and a key-value storage client. The key-value storage client receives a request to write a pair of a key and a value, calculates a hash value of the value, and generates a first pair, which includes the key and the hash value of the value as a key and a value respectively, and a second pair which includes the hash value of the value and the value as a key and a value respectively. The key-value storage client saves a pair of the key and the value of the first pair in a first key-value storage server, and saves a pair of the key and the value of the second pair in a second key-value storage server.

When a read request to obtain a value from a key is received, a key-value storage client searches the first key-value storage server, using the key, to obtain a hash value of the value that forms the first pair with the key, and searches the second key-value storage server, using the obtained hash value of the value, to obtain a value that forms the second pair with the hash value of the value. If the second pair of the hash value of the value and the value is not found in the search processing, the key-value storage client determines that the first pair is not saved normally in the first key-value storage server.

In the present invention, the key-value storage client determines the first and second key-value storage servers, in which the key and the value of the first pair and the second pair are stored, respectively, based on hash values of the keys of the first pair and the second pair.

In the present invention, the first key-value storage server comprises a first volatile storage device (for example, a semiconductor memory such as DRAM) and a first nonvolatile storage device (for example, a hard disk). The second key-value storage server comprises a second volatile storage device (for example, a semiconductor memory such as DRAM) and a second nonvolatile storage device (for example, a hard disk). The first and second key-value storage servers save the key and the value of the first pair and the second pair in the first and second volatile storage devices, respectively. The first key-value storage server saves the key and value of the first pair in the first nonvolatile storage device before a response to a write request is returned. The second key-value storage server saves the key and the value of the second pair in the second nonvolatile storage device at any time.

In the present invention, it may be configured that responsive to a request to write a pair of a key and a value, the key-value storage client stores the pair of the key and the value in a cache memory and, when a read request to obtain a value from a key is received and if the key and a value corresponding to the key are stored in the cache memory (at cache hit time), reads the value, corresponding to the key, from the cache memory and returns the value as a response and, at a cache mishit time, reads from the first and second key-value storage servers (reads Hash(Value) using Key and reads Value using Hash(Value) that has been read).

First Exemplary Embodiment

FIG. 1 is a diagram showing a system configuration of one exemplary embodiment of the present invention. Referring to FIG. 1, a node 1 has a memory 2 (for example, RAM) and a hard disk (abbreviated "disk") 3, as storages. A specified capacity (or area) is reserved in the memory 2 for use as key-value storage. The specified capacity (or area) in the memory 2 is called a "key-value storage memory 4". The key-value storage memory 4 is managed by a key-value storage server function 5. It is of course possible to configure the key-value storage memory 4, not in the memory 2, but in a semiconductor memory that has a different configuration.

When accessing the key-value storage memory 4, an application 6 accesses it via a key-value storage client function 7. On the other hand, when accessing an area other than the key-value storage memory 4 in the memory 2, the application 6 directly accesses the memory 2 as well as the hard disk 3, not via the key-value storage client function 7.

When there are a plurality of nodes 1, the key-value storage memory 4 is shared among multiple nodes 1 via a network 8 that interconnects the plurality of nodes 1.

More specifically, the key-value storage client function 7 identifies a target node 1 based on a hash value of a key, which is a pair of the key and value <key, value>, and accesses the key-value storage server function 5 of the target node 1 via the network 8 to implement a distributed storage.

The algorithm for identifying a node from a hash value of a key is shared by the key-value storage client function 7 of all nodes 1 connected to the network 8. Any sharing method may be used.

Figures 2A, 2B:
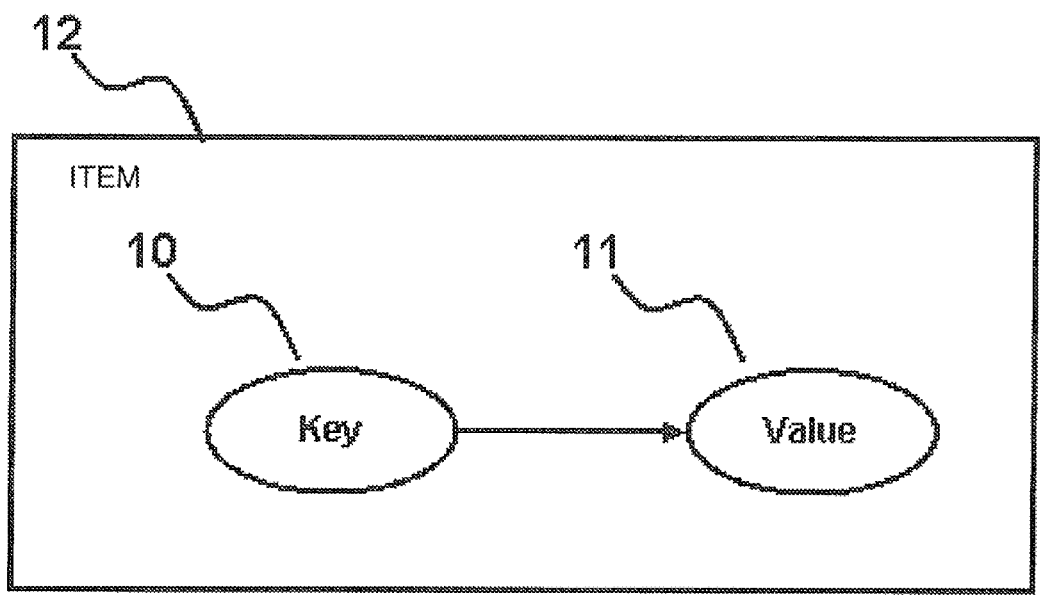
FIG. 2A is a diagram showing key-value storage.
FIG. 2B shows an example of key-value pairs.

Next, the following describes the key-value storage in this exemplary embodiment with reference to FIGS. 2A and 2B. The key-value storage is called an associative array in a programming language.

In FIG. 2A, any character string may be specified for a key 10, and a value (not limited to a character string) is stored in a value 11.

A pair of a key 10 and a value 11 is called an item 12 and is denoted as <K,V>. Data processing instructions for a key-value includes GET(read) and Put(write).

Get is an instruction (read instruction) for obtaining a value 11 based on a key 10.

Put is an instruction (write instruction) for storing the item 12 (=<K,V>). That is, Get and Put may be denoted as follows.
GET(K)=V
Put(<K,V>)

FIG. 2B shows an example of a key-value. The three items 12 are stored: <Red, Apple>, <Yellow, Orange>, and <Pink, Peach>. In this case, Get returns the following values.
GET(Red)=Apple
GET(Yellow)=Orange
GET(Pink)=Peach The merit of key-value storage is that the performance can be expanded scalably when the nodes are distributed. In the key-value storage, items 12 are independent of each other. That is, when one item 12 is changed, there is no need to change another item 12. Therefore, the distributed nodes 1 do not basically perform data exchange among them (except when a node failure occurs or a node is added, in which case data exchange is carried out among them).

The distribution algorithm, which uses a hash value of the key 10, eliminates the need for the multiple nodes 1 to make adjustment among them. This can be better understood by comparison with a tabular format. Assume that a table is divided by column or row and is distributed among nodes 1. When the value of one cell (identified by column and row) of the table is changed, the processing is performed only on the node 1 that has the data.

However, when the number of rows of a table is increased or a table is distributed by column, processing is required for the nodes 1 related to the column. For an n×m table, when n nodes corresponding to column m are distributed and the number of rows is increased to (n+1), each of the nodes related to column m is required to perform processing for the row that is added.

In a current relational database (RDB), a large table is divided into small tables (this processing is called normalization) and an index is created so that a response to a query is returned efficiently. The small table which a search is made is searched for the index. Therefore, it happens that one item of data is present in multiple small tables. In such a situation, it is difficult for RDB to provide scalability even when the tables are distributed.

Figure 3:
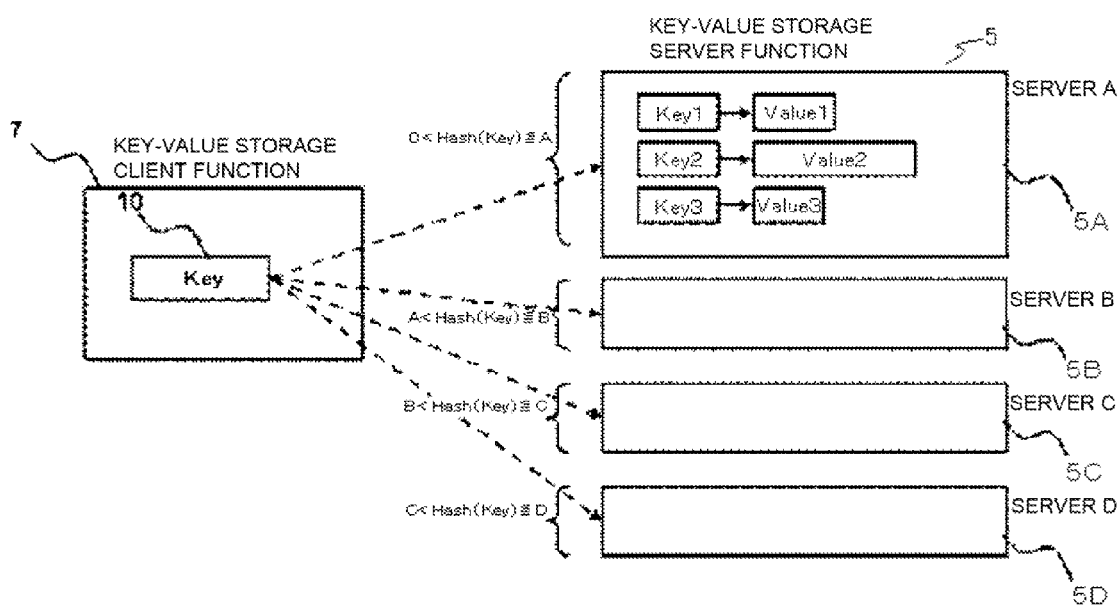
FIG. 3 is a diagram showing a distribution mode of key-value storage.

FIG. 3 is a diagram showing an example of distribution in the key-value storage in this exemplary embodiment. In this example, the key-value storage is distributed to a total of four nodes: comprised of key-value storage server functions 5A-5D.

The key-value storage client function 7 identifies which key-value storage server function 5 has an item 12 (set of key and value) according to a range of a hash value of a key 10, and performs Get/Put for the key-value storage server function 5 identified as a target. In the example shown in FIG. 3, the item 12 (set of Key and Value) is stored as follows according to a value of the hash function Hash(Key) of Key, as follows:

if 0<Hash(Key)≤A, the item 12 (set of key and value) is stored in the key-value storage server function 5A (server A), if A<Hash(Key)≤B, the item 12 (set of Key and Value) is stored in the key-value storage server function 5B (server B), if B<Hash(Key)≤C, the item 12 (set of Key and Value) is stored in the key-value storage server function 5C (server C), and if C<Hash(Key)≤D, the item 12 (set of Key and Value) is stored in the key-value storage server function 5D (server D).

Even when there are multiple key-value storage client functions 7, it is only required that a hash function, which identifies a corresponding key-value storage server function 5 from the key 10, be shared. Because the key-value storage server functions 5 are independent and do not exchange data among them as described above, the performance is increased scalably by increasing the number of nodes 1.

As described above, the reliability of storage is not ensured simply by saving data in the memory 2. Therefore, data is saved not only in the memory 2 but in the disk 3. In a usual operation, data is written on the hard disk 3 each time the item 12 is changed and, after confirming that a write operation is completed, the response is returned (synchronous type).

This operation is similar to write-through caching (wherein CPU writes data in memory and, at the same time, in a cache) and so there is no merit of using the memory 2.

Figure 4:
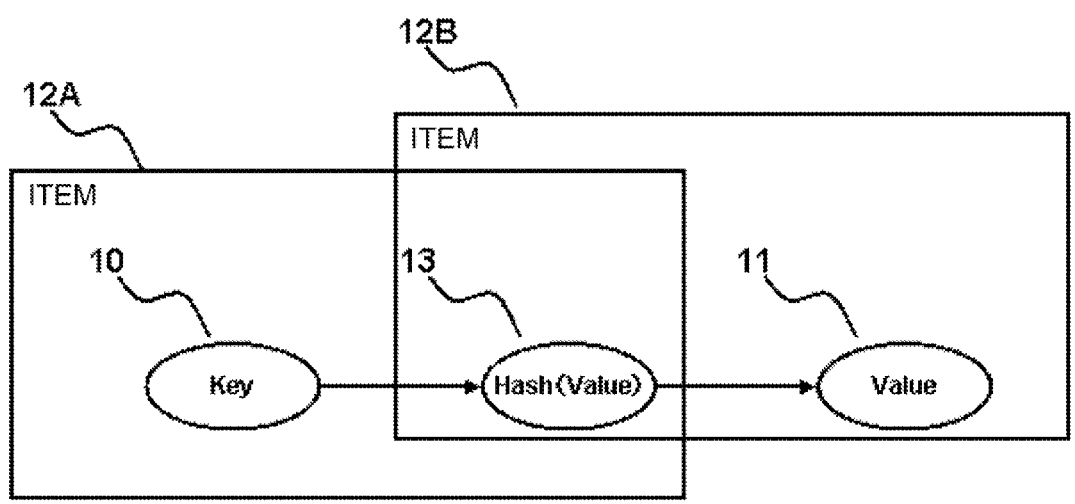
FIG. 4 is a diagram illustrating key-value storage in one exemplary embodiment of the present invention.

To address, this problem, the key-value storage is configured in this exemplary embodiment as a two-stage indirect reference configuration as shown schematically in FIG. 4.

A first-stage item 12A is composed of the key 10 and the hash value of the value 11 (denoted as =Hash(Value) 13). (item 12A=<key, Hash(Value)>).

A second-stage item 12B is composed of the Hash(Value) 13 and the value 11 (item 12B=<Hash(Value),V>). The Hash (Value) 13 is a fixed length value about dozens of bytes at the longest. The following summarizes the items in the first and second stages.

First stage: <key, Hash(Value)>

Second stage: <Hash(Value), value)>

This configuration decreases a size of the first-stage item 12A. For example, SHA (Secure Hash Algorithm)-1, one of the major hash algorithms, generates a 20-byte value. The block size is 4K bytes in many storage systems, meaning that the size becomes 1/20 when SHA-1 is used.

Figure 8:
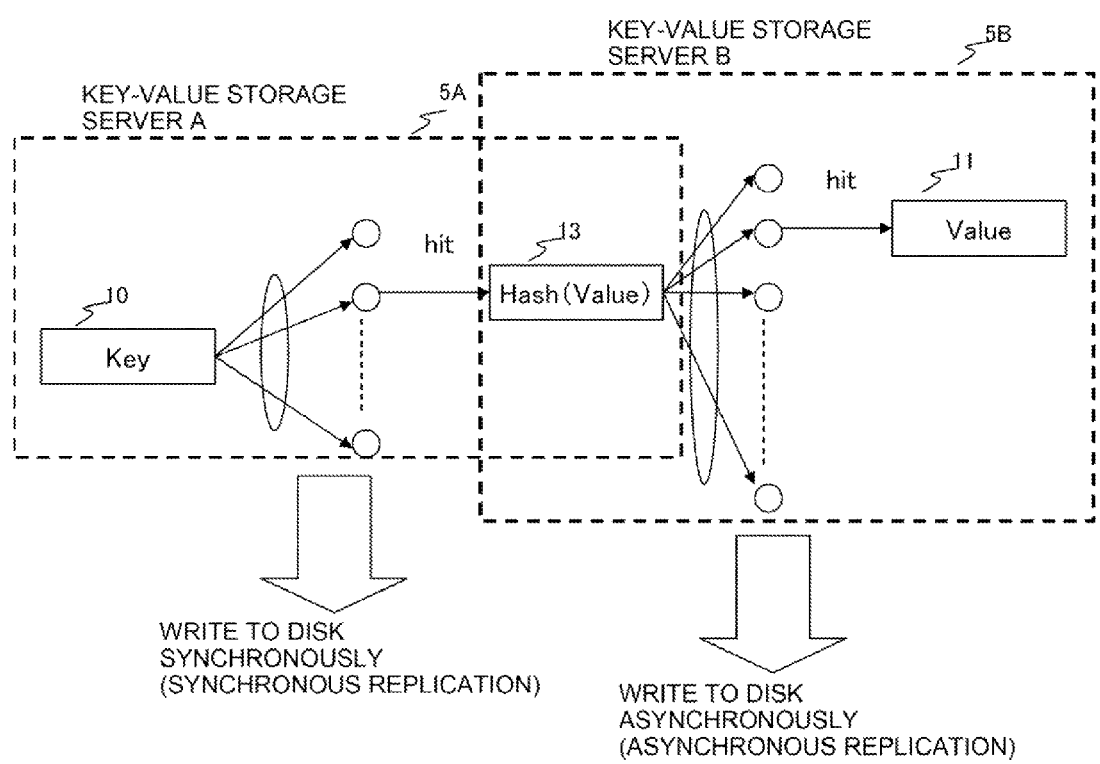
FIG. 8 is a diagram showing a distribution mode of key-value storage in one exemplary embodiment of the present invention.

FIG. 8 is a diagram schematically showing a relation between the two-stage indirect reference in the key-value storage schematically shown in FIG. 4 and key-value storage servers in a distributed storage system. Key-value storage server A, which is selected by a hash value Hash(Key), stores the first-stage value <Key,Hash(Value)>. In this case, key-value storage server A writes <Key,Hash(Value)> to the hard disk 3 synchronously with the writing of <Key,Hash(Value)> into the key-value storage memory 4 (see FIG. 1) (synchronous replication). Key-value storage server B, which is selected by the value generated by the Hash(Value) 13, writes the second-stage value <Hash(Value), Value> into the key-value storage memory 4 and, asynchronously, to the hard disk 3 (asynchronous replication).

Figure 5:
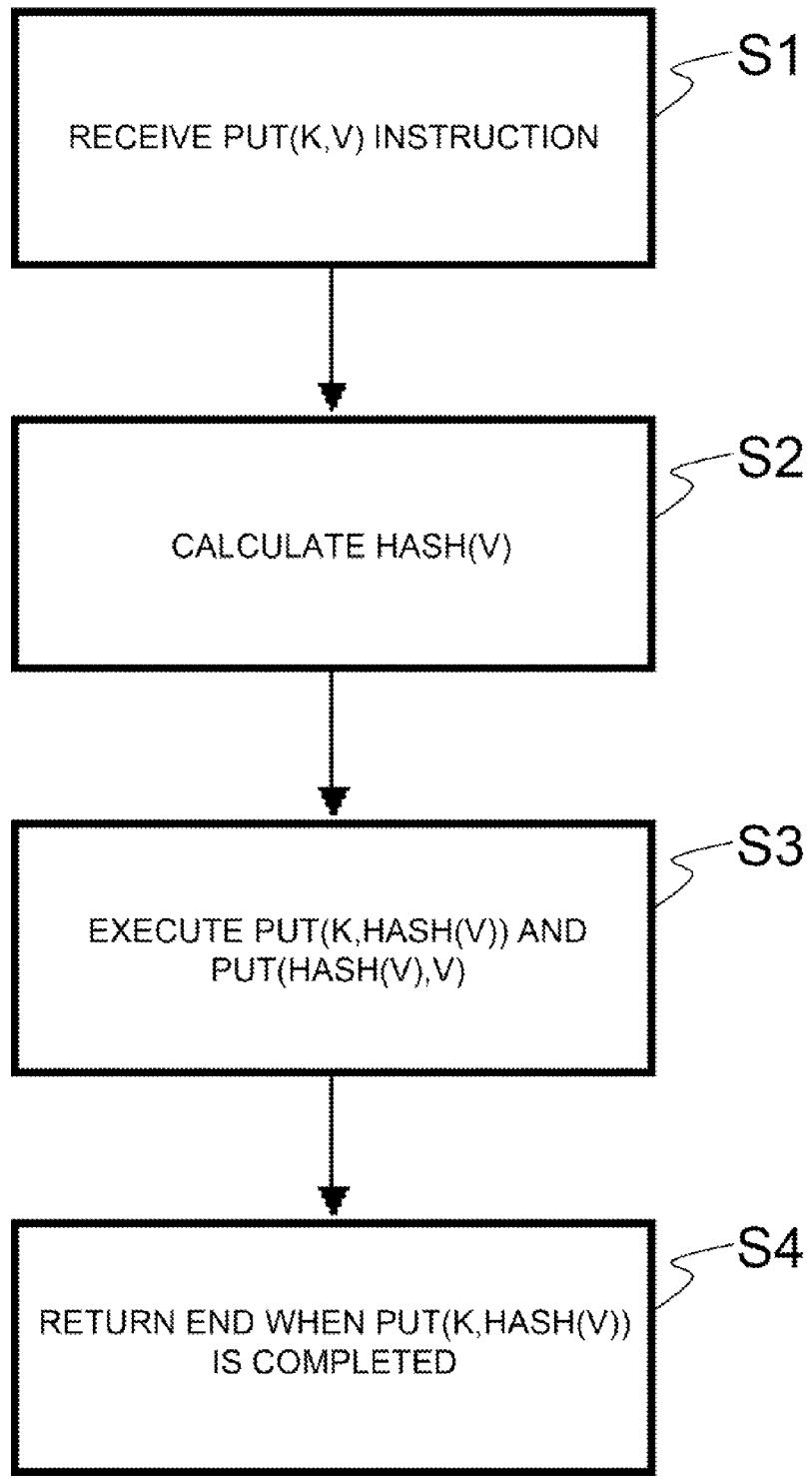
FIG. 5 is a flowchart showing a processing procedure for write PUT(K,V) in one exemplary embodiment of the present invention.

Next, the following describes the flow of READ/WRITE processed in the two-stage indirect reference of the key-value storage in this exemplary embodiment. FIG. 5 is a flowchart showing the processing flow of WRITE in this exemplary embodiment.

When an item <K,V> that is a pair of the key K and the value V to be stored on the disk is received, that is, when the PUT(K,V) instruction is received (step S1), the hash calculation is performed for V to calculate Hash(V) (step S2).

After that, PUT (K, Hash(V)) and PUT (Hash(V), V), that is, the item 12A (<K, HashV>)) and the item 12B (<Hash(V), V>) are Put(step S3). The item 12A (<K, Hash(V)>) and the item 12B (<Hash(V), V>) are written respectively into the key-value storage memory 4 of the key-value storage server functions 5 (see FIG. 1). The two items 12 can be stored into the key-value storage memories 4, in parallel. The item 12A (<K, Hash(V)>) is stored on the hard disk 3, synchronously.

When the response to Put of the item 12A (<K, Hash(V)>) is returned, the write completion response is returned (step S4). The item 12B is stored on the hard disk 3 asynchronously.

Figure 6:
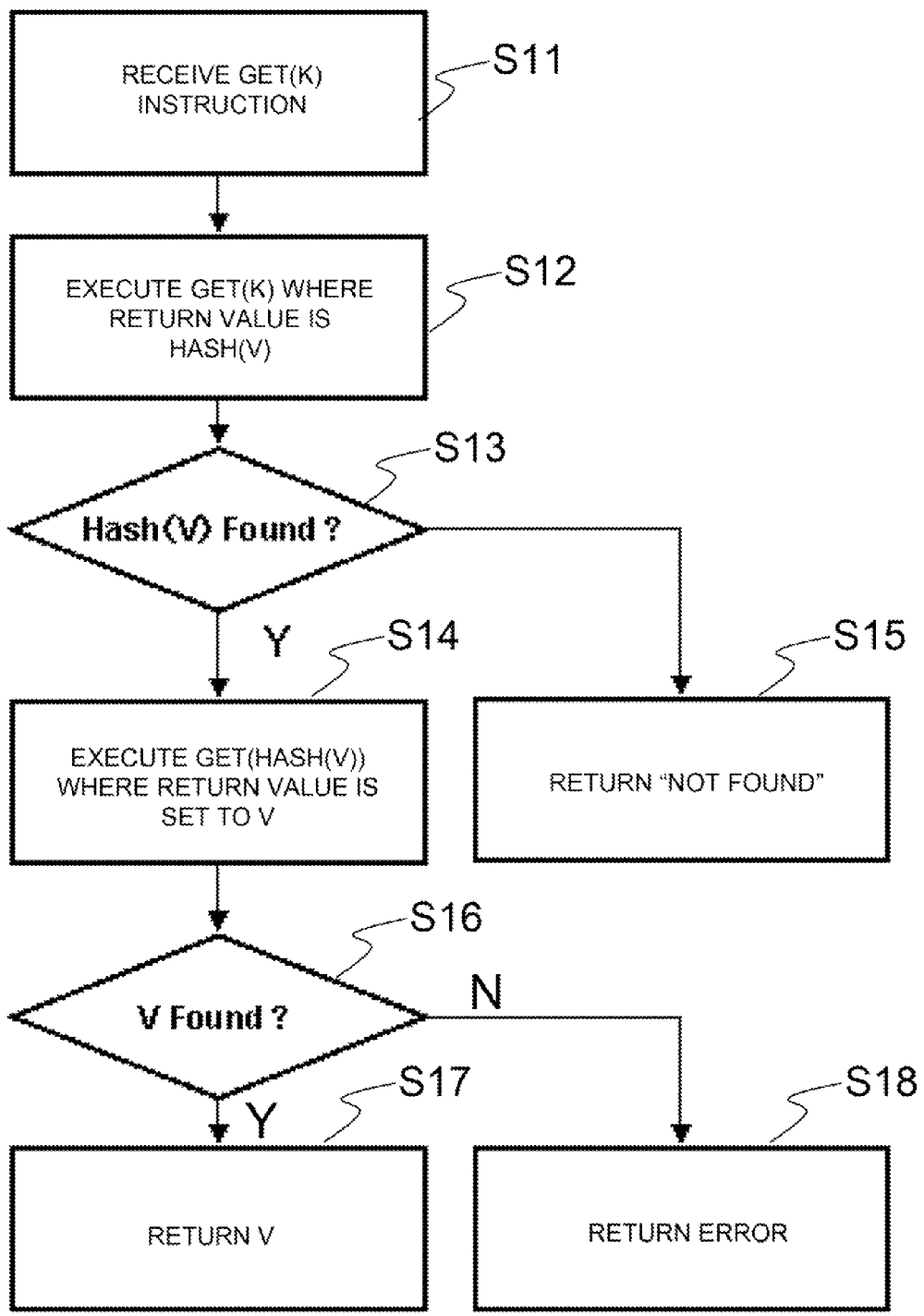
FIG. 6 is a flowchart showing a processing procedure for read GET(K) in one exemplary embodiment of the present invention.

FIG. 6 is a flowchart showing the processing flow of READ in this exemplary embodiment.

The GET(K) instruction is received (step S11) and the GET(K) instruction is executed, in which case the return value is Hash(V) (step S12). That is, at read time, the item 12A (<K, Hash(V)>) is obtained from the key 10.

If the item 12A (<K, Hash(V)>) is found, the item 12B (<Hash(V), V>) is obtained next from Hash(V) (GET(Hash (V)) is executed) (step S14), in which case the return value is V (step S14).

If the item 12A(<K, Hash(V)>) is not found, it means that there is no Hash(V) corresponding to the key of the item 12A in the first stage and in this case, "Not Found" is returned (step S15).

If the item 12A is found and the item 12B (<Hash(V) V>) is found (Y in step S16), V is returned.

If the item 12A is found but the item 12B (<Hash(V), V>) is not found (N in step S16), an error is returned because WRITE is in process or an error is generated (step S18).

That is, if the storage of the item 12B (<Hash(V), V>) fails or if a system error is generated before the item 12B is stored, it indicates that the writing of data has failed because the item 12B cannot be got at read time.

The most reliable storage in highly reliable storages is such a one that, when a write request is issued and a response to the write request is returned, the content of writing is reflected on the content of the storage without fail. However, if this reliable reflection is implemented by saving data on a disk, write processing is limited eventually by response time of the disk and therefore the effect of using a memory is lost.

One possible solution to this problem is that, when data stored in memory is saved on a disk, the data is saved asynchronously. However, when data stored in memory is saved on a disk asynchronously, the data cannot be written on the disk, when an error occurs before the data is saved on the disk.

Another problem that is more serious is that, if such a state occurs, it cannot be determined which data in the memory is not written to the disk. That is, it cannot be determined which data is correct. This leads to the situation that the entire data is unreliable.

In contrast, the present exemplary embodiment enables detection of whether or not data in the memory has been written normally to the disk. That is, it is possible to determine which data is correct. As described above, the data reliability can be enhanced by simply saving a hash value, which is much smaller in data amount than the data itself, on the disk.

Figure 9:
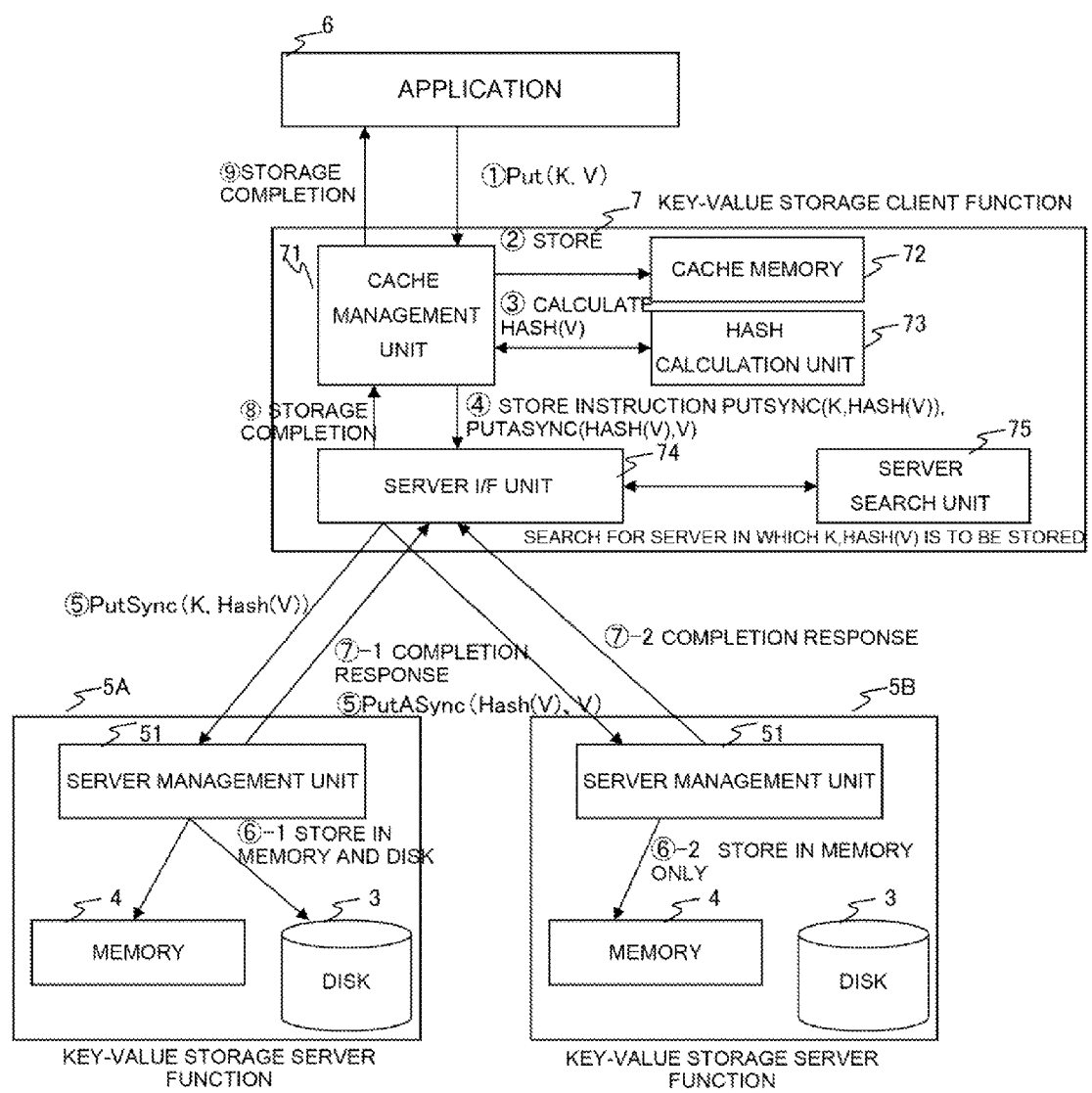
FIG. 9 is a diagram showing write PUT(K,V) in a distributed storage system in one example of the present invention.
Figure 10:
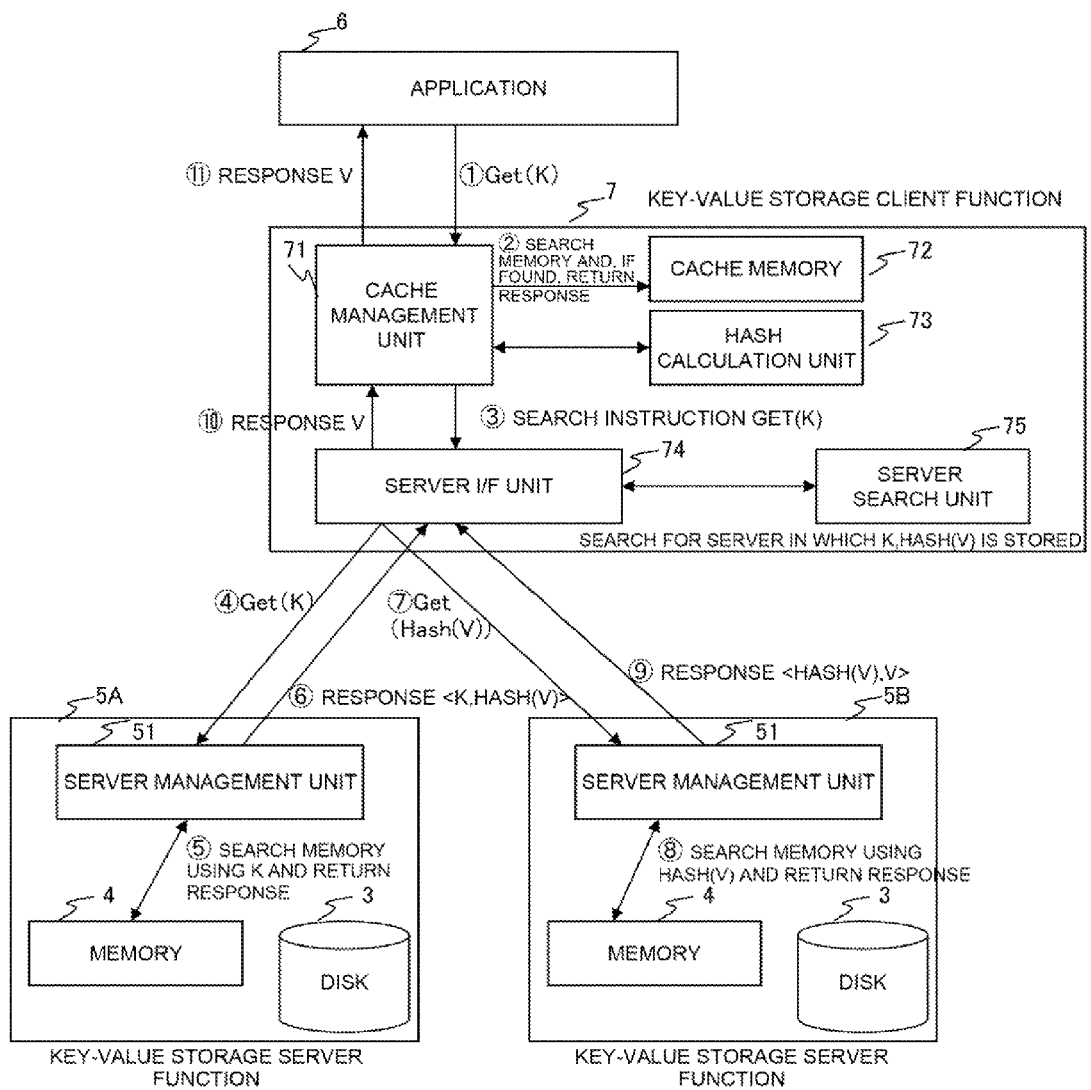
FIG. 10 is a diagram showing read GET(K) in a distributed storage system in one example of the present invention.

The following describes an example of the exemplary embodiment described above. FIG. 9 is a diagram showing the Put(K,V) instruction (equivalent to PUT(K,V) described above) in one exemplary embodiment of the present invention. FIG. 10 is a diagram showing the GET(K) instruction (equivalent to GET(K) described above) in one exemplary embodiment of the present invention. The key-value storage client function 7 comprises a cache management unit 71, a cache memory 72, a hash calculation unit 73, a server interface (I/F) unit 74, and a server search unit 75. Each of key-value storage server functions 5A and 5B comprises a server management unit 51, the memory 4, and the hard disk 3. The numerals each encircled by a circle in FIG. 9 and FIG. 10 correspond to the processing numbers given below.

First, the following describes Put instruction. Referring to FIG. 9, (1) The application 6 issues Put(K V) instruction to the key-value storage client function 7.

(2) The cache management unit 71 receives Put(K,V) instruction from the application 6 and stores a pair of the key and the value (item) <K,V> in the cache memory 72.

(3) The hash calculation unit 73 calculates a hash value of the value V, Hash(V), and provides it to the cache management unit 71.

(4) When Hash(V) that is a hash value of the value V is received from the hash calculation unit 73, the cache management unit 71 issues a storage instruction to the server interface unit 74. The cache management unit 71 issues the following storage instructions:

a synchronous Put instruction Putsync(K, Hash(V)) for <K, Hash(V)> that is a pair of a key and a hash-value of a value and an asynchronous Put instruction Putasync(Hash(V), V) for <Hash(V), V> that is a pair of a hash-value of a value and the value. The server search unit 75 searches for servers in which <K, Hash(V)> and <Hash(V), V> are to be stored. As described above, the server search unit 75 identifies a server in which the item <K,V> is saved, using the hash value Hash(K). In the example shown in FIG. 9, servers in which <K, Hash(V)> and <Hash(V), V> are saved are key-value storage server functions 5A and 5B, respectively.

(5) The server interface unit 74 outputs Putsync(K, Hash(V)) to the key-value storage server function 5A. The server interface unit 74 outputs Putasync(Hash(V), V) to the key-value storage server function 5B.

(6) The server management unit 51 of the key-value storage server function 5A, which receives the synchronous write instruction Putsync(K, Hash(V)), stores <K, Hash(V)) in the key-value storage memory 4 and the disk 3 (6-1). The server management unit 51 of the key-value storage server function 5B, which receives the asynchronous write instruction Putasync(Hash(V), V) first stores <Hash(V), V> in the key-value storage memory 4 (6-2). The server management unit 51 of the key-value storage server function 5B stores <Hash(V), V>, stored in the key-value storage memory 4, to the disk 3 asynchronously (asynchronous replication).

(7) When the storage of <K, Hash(V)> into the key-value storage memory 4 and the disk 3 is completed, the server management unit 51 of the key-value storage server function 5A returns a completion response to the server interface unit 74 of the key-value storage client function 7 (7-1). When the storage of <Hash(V), V> into the key-value storage memory 4 is completed, the server management unit, 51 of the key-value storage server function 5B returns a completion response to the server interface unit 74 of the key-value storage client function 7 (7-2).

(8) When the completion response is received from the key-value storage server function 5A or 5B, the server interface unit 74 of the key-value storage client function 7 returns a storage completion to the cache management unit 71.

(9) The cache management unit 71 that receives the storage completion from the server interface unit 74 returns a storage completion to the application 6.

Next, the following describes GET(K) instruction. Referring to FIG. 10, (1) The application 6 issues GET(K) instruction to the key-value storage client function 7.
(2) The cache management unit 71 receives GET(K) instruction from the application 6 and searches the cache memory 72 using the key K. When (item) <K,V> that is a pair of the key and the value is found in the cache memory 72 (at a time of cache hit), the cache management unit 71 returns the value V, read from the cache memory 72, to the application 6 as the response (access to the key-value storage function 5 is not carried out).
(3) When the pair <K,V> of the key and the value is not found in the cache memory 72 (at a time of cache mishit), the cache management unit 71 issues the search instruction GET(K) to the server interface unit 74. The server search unit 75 calculates the hash value of the key K and determines, and notifies the server interface unit 74, that the server that has <K,V> is the key-value storage server function 5A.
(4) The server interface unit 74 issues GET(K) to the key-value storage server function 5A.
(5) The server management unit 51 of the key-value storage server function 5A searches the key-value storage memory 4 using the key K and acquires Hash(V) of <K, Hash(V)>.
(6) The server management unit 51 of the key-value storage server function 5A returns the response <K, Hash(V)> to the key-value storage client function 7 as the response.
(7) The server interface unit 74 of the key-value storage client function 7 receives the response <K, Hash(V)> from the server management unit 51 of the key-value storage server function 5A as the response. Using Hash(V) as the key, the server search unit 75 identifies, and notifies the server interface unit 74, that the server in which <Hash(V), V> is saved is the key-value storage server function 5B based on the hash value Hash(Hash(V)). The server interface unit 74 issues the GET(Hash(V)) instruction to the server management unit 51 of the key-value storage server function 5B.
(8) The server management unit 51 of the key-value storage server function 5B searches the key-value storage memory 4 using the key Hash(V) and acquires V of <Hash(V), V>.
(9) The server management unit 51 of the key-value storage server function 5B returns <Hash(V), V> to the key-value storage client function 7 as the response.
(10) When the response <Hash(V), V> is received from the server management unit 51 of the key-value storage server function 5B, the server interface unit 74 of the key-value storage client function 7 returns the response V to the cache management unit 71.
(11) When the response V is received from the server interface unit 74, the cache management unit 71 of the key-value storage client function 7 returns the response V to the application 6 as the response to GET(K). The cache management unit 71 may also store <K,V>, which is the pair of the key K and the acquired value V, in the cache memory 72.

Second Exemplary Embodiment

In the present exemplary embodiment, content address storage (CAS) is used. In content address storage that is also referred to as content aware storage or content archive storage, data is saved as an object composed of content (byte stream) and metadata. When data is saved, an object ID (also called "content address") that identifies an object is generated and is returned to the requesting source (user, application). A user uses an object ID to read an object. A hash algorithm (SHA-1, SHA-256) is used for the object ID though not limited thereto. Metadata includes, for example, attribute information on the content (for example, generation time, retention period, content size, comment, etc.).

In the case of CAS, a content address (CA) is used in place of a hash value. That is,
First stage is <K,CA(V)> and
Second stage is <CA(V),V>
where CA(V) is a content address of a value V. The second stage is CAS itself.

However, this configuration has a problem. CA includes a hash value in many cases but includes other fields too. When data is stored in CAS, the CA is returned. That is, until the response from CAS is returned, it is impossible to put <K,CA(V)> in the first stage. In general, CAS is not fast-response storage.

Figure 7:
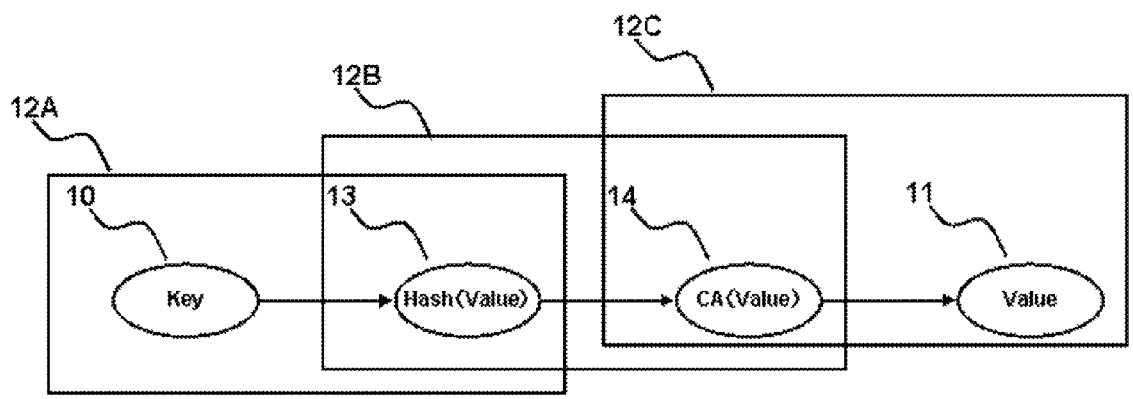
FIG. 7 is a diagram showing key-value storage in another exemplary embodiment of the present invention.

To solve this problem, the following configuration is used in the present exemplary embodiment in which one more stage is added for indirect reference.
First stage: <K, Hash(V)>
Second stage: <Hash(V),CA(V)>
Third stage: <CA(V),V>=CAS FIG. 7 is a diagram showing the relation of an item 12 in the present exemplary embodiment. In FIG. 7,
First stage (<Key,Hash(Value)>) is an item 12A,
Second stage (<Hash(Value),CA(Value)>) is an item 12B, and
Third stage (<CA(Value),Value>) is an item 12C.
The item 12C is CAS.

Because a response can be returned in a write operation, at a time when the item 12A(<K, Hash(V)>) in the first stage is stored, a fast response is returned.

The item is stored asynchronously in the second stage and the third stage as in the first exemplary embodiment described above. If a disk error occurs before the item is stored, no value can be obtained in the second stage and the third stage even if Get is issued with Hash(V) 13, obtained in the first stage, as the key. Therefore, it is detected that data is not reliable.

In the CAS configuration, multiple copies of the same file are not saved in the storage. That is, multiple copies of data are not saved and, as a result, the amount of saved data can be reduced.

INDUSTRIAL APPLICABILITY

The present invention increases reliability while maintaining memory speed in distributed storage that can be expanded scalably.

The mode and the exemplary embodiments may be changed and adjusted in the scope of the entire disclosure (including claims) of the present invention and based on the basic technological concept. In the scope of the claims of the present invention, various disclosed elements may be combined and selected in a variety of ways. That is, it is to be understood that the present invention includes various modifications and corrections that may be made by those skilled in the art according to the entire disclosure, including the claims, and the technical concept.

The whole or part of the exemplary embodiments disclosed above can be described as, but not limited to, the following supplementary notes.

(Supplementary Note 1)

A storage system having a key-value data store configuration in which a key and a value are stored in an associated manner and a key is searched for to find a value associated with said key, the storage system comprising a means that
responsive to a request to write a pair of a key and a value,
calculates a hash value of the value, and
stores a first pair including the key and the hash value of the value respectively as a key and a value and a second pair including the hash value of the value and the value respectively as a key and a value, respectively in a storage device, and responsive to a read request, searches the storage device, using a key specified by the read request, to obtain the hash value of the value that forms the first pair with the key, and searches the storage device, using the obtained hash value of the value, to obtain a value that forms the second pair with the hash value of the value, and if as a result of searching the storage device using the hash value of the value, a value that forms the second pair with the hash value of the value is not found in the storage device, determines that the first pair is not saved normally in the storage device.

(Supplementary Note 2)

The storage system according to Supplementary note 1, wherein responsive to a request to write a pair of a key and a value, the means saves the first pair and the second pair respectively in a volatile storage device, saves the first pair in a nonvolatile storage device at the same time the first pair is saved in the volatile storage device or at a later time before a response to the write request is returned to a requesting source, and saves the second pair in a nonvolatile storage device at the same time the second pair is saved in the volatile storage device or at any later time.

(Supplementary Note 3)

The storage system according to Supplementary note 1 or 2, wherein in a read access, in case the hash value of the value that forms the first pair with the key is found as a result of the search using the key, the means searches the storage device, using the hash value of the value as a key, to obtain the value of the second pair, wherein in case the hash value of the value that forms the first pair with the key is found and if the value that forms the second pair with the hash value of the value is found, the means returns the value as a result of the read, in case the hash value of the value that forms the first pair with the key is not found, the means returns information indicating that there is no value corresponding to the key, and in case the hash value of the value that forms the first pair with the key is found but if the value that forms the second pair with the hash value of the value is not found, the means returns an error.

(Supplementary Note 4)

A storage system having a data configuration in which a key and a value are stored in an associated manner and a key is searched for to find a value associated with the key, the storage system comprising means that, when writing a key and a value, stores the first pair and the second pair respectively in a volatile storage device, the first pair including the key and the hash value of the value, the second pair including the hash value of the value and the value, saves the first pair in a nonvolatile storage device before a response is returned, and saves the second pair in a nonvolatile storage device at any time with the second pair saved in the volatile storage device; and means that, when a value is obtained from a key in a read access, determines that data is not stored normally, if the second pair is not found in processing in which the second pair is read after obtaining the hash value of the value from the first pair.

(Supplementary Note 5)

The storage system according to any one of Supplementary notes 1-4, further comprising content address storage (CAS) that, when data and metadata are saved as an object, generates an object identifier and returns a content address that is the object identifier and that is used to access the object wherein a first pair is a pair of a key and a hash value of a value and a second pair is not a pair of the hash value of the value and the value but a pair of the hash value of the value, which is used as the key, and a content address of the value which is used as the value and the value is saved in the content address storage.

(Supplementary Note 6)

A distributed storage system including multiple networked nodes each comprising a storage system according to any one of Supplementary notes 1-5.

(Supplementary Note 7)

The distributed storage system, wherein each node comprises:

a plurality of key-value storage servers each of which stores a pair of a key and a value at write time and obtains a value through a search using a key in a read access; and a storage client that receives a request to write a pair of a key and a value, calculates a hash value of the value, generates a first pair and a second pair, the first pair including the key and the hash value of the value as a key and a value respectively, the second pair including the hash value of the value and the value as a key and a value respectively, saves a pair of the key and the value of the first pair in a first key-value storage server, and saves a pair of the key and the value of the second pair in a second key-value storage server.

(Supplementary Note 8)

The distributed storage system according to Supplementary note 7, wherein, when a read request to obtain a value from a key is received, the storage client searches the first key-value storage server, using the key, to obtain the hash value of the value that forms the first pair with the key, and searches the second key-value storage server, using the hash value of the value, to obtain the value that forms the second pair with the hash value of the value and, if the second pair of the hash value of the value and the value is not found in the search processing, determines that the first pair is not saved normally in the first key-value storage server.

(Supplementary Note 9)

The distributed storage system according to Supplementary note 7 or 8, wherein the storage client determines the first and second key-value storage servers, in which the key and the value of the first pair and the second pair are stored, based on a hash value of the key of the first pair and the second pair.

(Supplementary Note 10)

The distributed storage system according to any one of Supplementary notes 7-9, wherein the first key-value storage server comprises a first volatile storage device and a first nonvolatile storage device, the second key-value storage server comprises a second volatile storage device and a second nonvolatile storage device, the first key-value storage server saves the key and the value of the first pair in the first volatile storage device, the second key-value storage server saves the key and the value of the second pair in the second volatile storage device, the first key-value storage server saves the key and the value of the first pair in the first nonvolatile storage device before a response to the write request is returned and the second key-value storage server saves the key and the value of the second pair in the second nonvolatile storage device at any time.

(Supplementary Note 11)

The distributed storage system according to any one of Supplementary notes 7-9, wherein responsive to a request to write a pair of a key and a value, the storage client stores the pair of the key and the value in a cache memory and responsive a read request to obtain a value from a key, if the key and a value corresponding to the key are stored in the cache memory, the storage client reads the value, corresponding to the key, from the cache memory and returns the value as a response.

(Supplementary Note 12)

A storage access method for use on key-value storage in which a key and a value are stored in an associated manner and a key is searched for to find a value associated with said key, the method comprising:

responsive to a request to write a pair of a key and a value, calculating a hash value of the value; and storing a first pair and a second pair respectively in a storage device, the first pair including the key and the hash value of the value respectively as a key and a value, the second pair including the hash value of the value and the value respectively as a key and a value, the method further comprising:

responsive to a read request, searching the storage device, using a key specified by the read request, to obtain the hash value of the value that forms the first pair with the key; and searching the storage device, using the obtained hash value of the value, to obtain a value that forms the second pair with the hash value of the value, and if as a result of searching the storage device using the hash value of the value, a value that forms the second pair with the hash value of the value is not found in the storage device, determining that the first pair is not saved normally in the storage device.

(Supplementary Note 13)

The storage access method according to Supplementary note 12, further comprising:

responsive to a request to write a pair of a key and a value, saving the first pair and the second pair respectively in a volatile storage device;

saving the first pair in a nonvolatile storage device at the same time the first pair is saved in the volatile storage device or at a later time before a response to the write request is returned to a requesting source; and saving the second pair in a nonvolatile storage device at the same time the second pair is saved in the volatile storage device or at any later time.

(Supplementary Note 14)

The storage access method according to Supplementary note 12 or 13, further comprising:

in a read access, in case the hash value of the value that forms the first pair with the key is found as a result of the search using the key, searching the storage device, using the hash value of the value as a key, to obtain the value of the second pair;

in case the hash value of the value that forms the first pair with the key is found and if the value that forms the second pair with the hash value of the value is found, returning the value as a result of the read;

in case the hash value of the value that forms the first pair with the key is not found, returning information indicating that there is no value corresponding to the key; and in case the hash value of the value that forms the first pair with the key is found but if the value that forms the second pair with the hash value of the value is not found, returning an error.

(Supplementary Note 15)

A storage access method for use in a storage system having a data configuration in which a key and a value are stored in an associated manner and a key is searched for to find a value associated with the key, the storage access method comprising:

when writing a key and a value, storing a first pair and a second pair respectively in a volatile storage device, the first pair including the key and the hash value of the value, the second pair including the hash value of the value and the value;

saving the first pair in a nonvolatile storage device before a response is returned;

saving the second pair in a nonvolatile storage device at any time with the second pair saved in the volatile storage device; and when a value is obtained from a key in a read access, determining that data is not stored normally if the second pair is not found in processing in which the second pair is read after obtaining the hash value of the value from the first pair.

(Supplementary Note 16)

The storage access method according to any one Supplementary notes 12-15, further comprising:

saving the value of a pair of a key and a value in content address storage (CAS) that, when data and metadata are saved as an object, generates an object identifier and returns a content address that is the object identifier and that is used to access the object wherein a first pair is a pair of a key and a hash value of a value and a second pair is not a pair of the hash value of the value and the value but a pair of the hash value of the value, which is used as the key, and a content address of the value which is used as the value.

(Supplementary Note 17)

A distributed storage access method comprising:

by a storage client that receives a request to write a pair of a key and a value from an application, calculating a hash value of the value;

generating a first pair and a second pair, the first pair including the key and the hash value of the value as a key and a value respectively, the second pair including the hash value of the value and the value as a key and a value respectively;

saving a pair of the key and the value of the first pair in a first key-value storage server; and saving a pair of the key and the value of the second pair in a second key-value storage server.

(Supplementary Note 18)

The distributed storage access method according to Supplementary node 17, further comprising, by the storage client, when a read request, which specifies a key, is received from an application, searching the first key-value storage server, using the key, to obtain the hash value of the value that forms the first pair with the key; and searching the second key-value storage server, using the hash value of the value, to obtain the value that forms the second pair with the hash value of the value and, if the second pair of the hash value of the value and the value is not found in the search processing, determining that the first pair is not saved normally in the first key-value storage server.

(Supplementary Note 19)

The distributed storage access method according to Supplementary note 17 or 18, wherein the storage client determines the first and second key-value storage servers, in which the key and the value of the first pair and the second pair are stored, based on a hash value of the key of the first pair and the second pair.

(Supplementary Note 20)

The distributed storage access method according to any one of Supplementary notes 17-19, wherein the first key-value storage server comprises a first volatile storage device and a first nonvolatile storage device, the second key-value storage server comprises a second volatile storage device and a second nonvolatile storage device, the first and second key-value storage servers save the key and the value of the first pair in the first volatile storage device, and the key and the value of the second pair in the second volatile storage device respectively, the first key-value storage server saves the key and the value of the first pair in the first nonvolatile storage device before a response to the write request is returned and the second key-value storage server saves the key and the value of the second pair in the second nonvolatile storage device at any time.

(Supplementary Note 21)

A program that causes a computer, which configures a storage system in which a key and a value are stored in an associated manner and a key is searched for to find a value associated with said key, to execute the processing comprising:

responsive to a request to write a pair of a key and a value,
calculating a hash value of the value; and
storing a first pair and a second pair respectively in a storage device, the first pair including the key and the hash value of the value respectively as a key and a value, the second pair including the hash value of the value and the value respectively as a key and a value, and responsive to a read request,
searching the storage device, using a key specified by the read request, to obtain the hash value of the value that forms the first pair with the key; and
searching the storage device, using the obtained hash value of the value, to obtain a value that forms the second pair with the hash value of the value, and if as a result of searching the storage device using the hash value of the value, a value that forms the second pair with the hash value of the value is not found in the storage device, it is determined that the first pair is not saved normally in the storage device.

(Supplementary Note 22)

The program according to Supplementary note 21, the program further causing the computer to execute the processing comprising:

responsive to a request to write a pair of a key and a value,
saving the first pair and the second pair respectively in a volatile storage device;
saving the first pair in a nonvolatile storage device at the same time the first pair is saved in the volatile storage device or at a later time before a response to the write request is returned to a requesting source; and
saving the second pair in a nonvolatile storage device at, the same time the second pair is saved in the volatile storage device or at any later time.

(Supplementary Note 23)

The program according to Supplementary note 21 or 22, the program further causing the computer to execute the processing comprising:

in a read access,
in case the hash value of the value that forms the first pair with the key is found as a result of the search using the key,
searching the storage device, using the hash value of the value as a key, to obtain the value of the second pair;
in case the hash value of the value that forms the first pair with the key is found and if the value that forms the second pair with the hash value of the value is found,
returning the value as a result of the read;
in case the hash value of the value that forms the first pair with the key is not found,
returning information indicating that there is no value corresponding to the key; and
in case the hash value of the value that forms the first pair with the key is found but if the value that forms the second pair with the hash value of the value is not found,
returning an error.

(Supplementary Note 24)

A program causing a computer that configures a storage system having a data configuration in which a key and a value are stored in an associated manner and a key is searched for to find a value associated with the key, the program causing the computer to execute the processing comprising:

storing a first pair of a key and a hash value of a value and a second pair of the hash value of the value and the value;
saving the first pair in a first nonvolatile storage device before returning a response;
saving the second pair in the first storage device at any time with the second pair saved in a second volatile storage device; and
when a value is obtained from a key, determining that data is not stored normally in the first storage device if the second pair is not found in processing in which the second pair is read after obtaining the hash value of the value from the first pair.

(Supplementary Note 25)

The program according to any one of Supplementary notes 21-24, the program further causing the computer to execute the processing comprising:

saving the value of a pair of a key and a value in content address storage (CAS) that, when data and metadata are saved as an object, generates an object identifier and returns a content address that is the object identifier and that is used to access the object, wherein a first pair is a pair of a key and a hash value of a value and a second pair is not a pair of the hash value of the value and the value but a pair of the hash value of the value, which is used as the key, and a content address of the value which is used as the value. According to the present invention, there is also provided a computer-readable recording medium storing the program according to any one of Supplementary notes 21-25.

What is claimed is:

1. A storage system having a key-value data store configuration in which a key and a value are stored in an associated manner and a key specified is searched for to find a value associated with the key specified, said storage system comprising:

a storage device; and
a unit means that responsive to a request to write a pair of
a key and a value,
calculates a hash value of said value, and
stores a first pair including said key and said hash value of said value respectively as a key and a value, and a second pair including said hash value of said value and said value respectively as a key and a value, respectively in said storage device, and that responsive to a read request, searches said storage device, using a key specified by said read request, to find a hash value of a value that forms said first pair with said key specified, and searches said storage device, using said found hash value of said value, to find a value that forms said second pair with said hash value of said value, and if as a result of searching said storage device using said hash value of said value, a value that forms said second pair with said hash value of said value is not found in said storage device, determines that said first pair is not saved normally in said storage device;

a volatile storage device and a nonvolatile storage device, and wherein responsive to a request to write a pair of a key and a value, said unit means saves said first pair and said second pair respectively in said volatile storage device, saves said first pair in said nonvolatile storage device at a same time said first pair is saved in said volatile storage device, or at a later time before returning a response to said write request to a requesting source, and saves said second pair in said nonvolatile storage device at a same time said second pair is saved in said volatile storage device or at any later time.

2. The storage system according to claim 1, wherein, in a read access, in case said hash value of said value that forms said first pair with said key is found as a result of said search using said key, then said unit searches said storage device, using said hash value of said value as a key, to find said value of said second pair, wherein in case said hash value of said value that forms said first pair with said key is found and if said value that forms said second pair with said hash value of said value is found, said unit returns said value as a read result, in case said hash value of said value that forms said first pair with said key is not found, said unit returns information indicating that there is no value corresponding to said key, and in case said hash value of said value that forms said first pair with said key is found but if said value that forms said second pair with said hash value of said value is not found, said unit returns an error.

3. The storage system according to claim 1, further comprising:

a unit that, when writing a key and a value, stores said first pair and said second pair respectively in a volatile storage device, saves said first pair in a nonvolatile storage device before returning a response, and saves said second pair in a nonvolatile storage device at any time with said second pair saved in said volatile storage device; and a unit that, in a read access which obtains a value from a key, determines that data is not stored normally if said second pair is not found in processing which reads said second pair after obtaining a hash value of a value from said first pair.

4. The storage system according to claim 1, further comprising a content address storage (CAS) which when data and metadata are saved as an object, generates an object identifier and returns a content address that is said object identifier, and in which said content address is used to access said object, wherein said first pair includes a pair of a key and a hash value of a value, and said second pair includes, not a pair of said hash value of said value and said value, but a pair of said hash value of said value, which is used as said key, and a content address of said value, which is used as said value, and said value is saved in said content address storage.

5. A distributed storage system having a plurality of nodes, each of which is connected to a network and has said storage system according to claim 1.

6. The distributed storage system according to claim 5, wherein said node comprises:

a plurality of key-value storage servers, each of which stores a key and a value in an associated manner in a write access and obtains a value through a search using a key in a read access; and a storage client that receives a request to write a pair of a key and a value, calculates a hash value of said value, generates a first pair including said key and said hash value of said value as a key and a value respectively, and a second pair including said hash value of said value and said value as a key and a value respectively, saves a pair of said key and said value of said first pair in a first key-value storage server, and saves a pair of said key and said value of said second pair in a second key-value storage server.

7. The distributed storage system according to claim 6, wherein when a read request to obtain a value from a key is received, said storage client searches said first key-value storage server, using said key, to find said hash value of said value that forms said first pair with said key, and searches said second key-value storage server, using said hash value of said value, to find said value that forms said second pair with said hash value of said value, and if said second pair of said hash value of said value and said value is not found in said search processing, determines that said first pair is not saved normally in said first key-value storage server.

8. The distributed storage system according to claim 6, wherein said storage client determines said first and second key-value storage servers, in which said key and said value of said first pair and said second pair are stored, based on a hash value of said key of said first pair and said second pair.

9. The distributed storage system according to claim 6, wherein said first key-value storage server comprises a first volatile storage device and a first nonvolatile storage device, and said second key-value storage server comprises a second volatile storage device and a second nonvolatile storage device, wherein said first key-value storage server saves said key and said value of said first pair in said first volatile storage device, said second key-value storage server saves said key and said value of said second pair in said second volatile storage device, said first key-value storage server saves said key and said value of said first pair in said first nonvolatile storage device before returning a response to said write request, and said second key-value storage server saves said key and said value of said second pair in said second nonvolatile storage device at any time.

10. The distributed storage system according to claim 6, wherein responsive to a request to write a pair of a key and a value, said storage client stores said pair of said key and said value in a cache memory and wherein when a read request to obtain a value from a key is received, if said key and a value corresponding to said key are stored in said cache memory, said storage client reads said value, corresponding to said key, from said cache memory and returns said value as a response.

11. A storage access method for use on key-value storage in which a key and a value are stored in an associated manner and a key specified is searched for to find a value associated with said key specified, said method comprising:

responsive to a request to write a pair of a key and a value, calculating a hash value of said value; and storing a first pair including said key and said hash value of said value respectively as a key and a value and a second pair including said hash value of said value and said value respectively as a key and a value, respectively in a storage device, saving said first pair and said second pair respectively in a volatile storage device;

saving said first pair in a nonvolatile storage device at a same time said first pair is saved in said volatile storage device, or at a later time before returning a response to said write request to a requesting source; and saving said second pair in a nonvolatile storage device at a same time said second pair is saved in said volatile storage device, or at any later time;

said method further comprising:

responsive to a read request, searching said storage device, using a key specified by said read request, to find said hash value of said value that forms said first pair with said key; and searching said storage device, using said found hash value of said value, to find a value that forms said second pair with said hash value of said value, and if as a result of searching said storage device using said hash value of said value, a value that forms said second pair with said hash value of said value is not found in said storage device, determining that said first pair is not saved normally in said storage device.

12. The method according to claim 11, further comprising:

in a read access, in case said hash value of said value that forms said first pair with said key is found as a result of said search using said key, searching said storage device, using said hash value of said value as a key, to find said value of said second pair, in case said hash value of said value that forms said first pair with said key is found and if said value that forms said second pair with said hash value of said value is found, returning said value as a read result, in case said hash value of said value that forms said first pair with said key is not found, returning information indicating that there is no value corresponding to said key, and in case said hash value of said value that forms said first pair with said key is found but if said value that forms said second pair with said hash value of said value is not found, returning an error.

13. The method according to claim 11, further comprising: when writing a key and a value, storing said first pair and said second pair respectively in a volatile storage device, saving said first pair in a nonvolatile storage device before returning a response, and saving said second pair in a nonvolatile storage device at any time with said second pair saved in said volatile storage device; and in a read access which obtains a value from a key, determining that data is not stored normally, if said second pair is not found in processing which reads said second pair after obtaining a hash value of a value from said first pair.

14. The method according to claim 11, wherein said first pair includes a pair of a key and a hash value of a value, and said second pair includes, not a pair of said hash value of said value and said value, but a pair of said hash value of said value, which is used as said key, and a content address of said value, which is used as said value, said method comprising saving said value in a content address storage (CAS) which when data and metadata are saved as an object, generates an object identifier and returns a content address that is said object identifier, and in which said content address is used to access said object.

15. A non-transitory computer-readable recording medium storing a program that causes a computer which configures a storage system in which a key and a value are stored in an associated manner and a key is searched for to find a value associated with said key, to execute the processing comprising:

responsive to a request to write a pair of a key and a value, calculating a hash value of said value; and storing a first pair including said key and said hash value of said value respectively as a key and a value, and a second pair including said hash value of said value and said value respectively as a key and a value, respectively in a storage device;

saving said first pair and said second pair respectively in a volatile storage device;

saving said first pair in a nonvolatile storage device at a same time said first pair is saved in said volatile storage device or at a later time before returning a response to said write request to a requesting source; and saving said second pair in a nonvolatile storage device at a same time said second pair is saved in said volatile storage device or at any later time; and responsive to a read request, searching said storage device, using a key specified by said read request, to find said hash value of said value that forms said first pair with said key; and searching said storage device, using said obtained hash value of said value, to find a value that forms said second pair with said hash value of said value, and if as a result of searching said storage device using said hash value of said value, a value that forms said second pair with said hash value of said value is not found in said storage device, determining that said first pair is not saved normally in said storage device.

* * * * *